United States Patent Office 3,763,175
Patented Oct. 2, 1973

3,763,175
METHOD FOR THE PREPARATION OF CYCLIC NITRILE SULFITES
Emmett H. Burk, Jr., Glenwood, Ill., and Donald D. Carlos, Crown Point, Ind., assignors to Atlantic Richfield Company
No Drawing. Continuation-in-part of application Ser. No. 729,940, May 17, 1968, which is a continuation of abandoned application Ser. No. 573,459, Aug. 19, 1966, which in turn is a continuation-in-part of application Ser. No. 471,714, July 13, 1965, now Patent No. 3,268,542, and abandoned applications Ser. Nos. 502,327, 502,328, 502,347, 502,348, 502,450, 502,464, and 502,604, all Oct. 22, 1965. This application Feb. 25, 1969, Ser. No. 802,266
Int. Cl. C07d 91/04
U.S. Cl. 260—301
12 Claims

ABSTRACT OF THE DISCLOSURE

Cyclic nitrile sulfites of the formula:

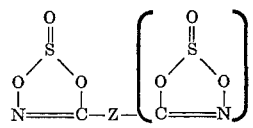

wherein Z is a hydrocarbon radical and $n$ is 0 to 3, are prepared by reacting the corresponding hydroxamic acid with at least about 5 moles of thionyl chloride per mole of hydroxamic acid group, the amount of thionyl chloride being sufficient to produce a fluid reaction medium. The excess thionyl chloride reactant serves as a solvent for the hydroxamic acid reactant, and the reaction is conducted in the substantial absence of an added solvent for the hydroxamic acid.

---

The application is a continuation-in-part of application Ser. No. 729,940, filed May 17, 1968, which latter application is in turn a continuation of abandoned application Ser. No. 573,459, filed Aug. 19, 1966, which latter application is in turn a continuation-in-part of abandoned application Ser. No. 471,714, filed July 13, 1965, now U.S. Pat. No. 3,268,542, and abandoned applications Ser. Nos. 502,327; 502,328; 502,347; 502,348; 502,450; 502,464; and 502,604; all filed Oct. 22, 1965.

The above applications are herein incorporated by reference.

The present invention concerns the preparation of compounds represented by the formula:

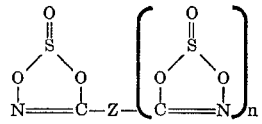

wherein Z is a hydrocarbon radical and $n$ is 0 to 3.

The materials are prepared in this invention by reaction of the corresponding hydroxamic acids with a substantial excess of thionyl chloride and without the need of any other solvent. The Z radical in the above formula represents a mono or polyvalent structure which often has from 1 to about 30 or to about 50 carbon atoms or more, preferably up to about 12 carbon atoms. These radicals may be aliphatic or aromatic, including mixed aromatic-aliphatic groups, e.g. alkyl, phenyl, monoalkenyl, alkaryl, dialkenyl, aralkyl, etc. The radicals may be saturated or unsaturated, e.g. contain olefinic bonds, and may contain non-deleterious substituents. The products of the foregoing formula can be decomposed to the corresponding isocyanates. For convenience we refer to our products as cyclic nitrile sulfites.

The reaction of hydroxamic acids with thionyl chloride has been described in U.S. Pat. No. 2,394,597 and by Marquis in Compt. Rend. 143, pp. 1163-4 (1906). There is no indication that the products prepared by the process of the present invention resulted from these prior works, but in any event the reactions described did not give very high yields. Marquis carried out his reaction in the presence of ether as a solvent and reported that attempts to conduct the reaction without a solvent were unsuccessful in the cold or when heated. The reactions of U.S. Pat. No. 2,394,597 were effected in an inert liquid such as benzene.

In the method of the present invention our products are made in high yields by reacting the hydroxamic acid with thionyl chloride while the latter is in substantial excess, thereby serving as a solvent for the reaction. Thus, we conduct the reaction in the presence of at least about 5 moles of thionyl chloride for each mole of hydroxamic acid group and the amount being sufficient to provide a fluid reaction system. While we have successfully used as high as about 35 moles of thionyl chloride for each mole of hydroxamic acid group (see Example IV herein) there seems to be no advantage in going substantially beyond about 10 or 20 moles per mole of hydroxamic acid group which justifies the additional equipment capacity that handling such large volumes entails.

The temperature for effecting the reactions of the hydroxamic acid and thionyl chloride may vary depending upon the particular hydroxamic acid selected, but in all cases the reactions should be conducted below the decomposition temperature of the desired nitrile sulfite product. Reflux temperatures can also be used as long as the reflux temperature of the particular mixture is below the decomposition temperature of the corresponding nitrile sulfite produced. The reaction temperatures will often fall in the range of up to about 90° C. In making the aliphatic nitrile sulfites the temperature is often up to about 40° to 70° C., preferably up to about 30° C. Preferred temperatures for making the aromatic nitrile sulfites are up to about 50 to 60° C. The reactions have been successfully run at temperatures as low as about minus 30° C. Ordinarily the reactions will proceed readily at atmospheric pressure but sub- and super-atmospheric pressures can be employed if desired.

The reactions are often essentially over in less than about 0.5 hour, for example 15 minutes, or in about 5 to 20 hours, depending upon the reaction temperature employed, and are marked by a cessation in hydrogen chloride gas evolution. Normally at least about 0.5 hour is required for the reactions to go to completion at temperatures which minimize side reactions. The reactions are usually quite rapid as the hydroxamic acid is dissolved. At the lower reaction temperatures the hydroxamic acid is generally slow to dissolve and may even come out of solution, go back into solution, etc., during the reaction.

The nitrile sulfites can be recovered from the reaction medium by any desirable means—for instance, by first filtering the resulting product solution to remove any unreacted starting materials and subjecting the filtrate to reduced pressure to remove unreacted thionyl chloride and provide the nitrile sulfite as a crude product. Alternatively, prior to the filtering step, the solution can be cooled to crystallize out the product, which can then be recovered as described. The crude product can be either crystalline or liquid depending on the particular nitrile sulfite prepared. A purer product, e.g. essentially chlorine-free, can be obtained by recrystallization techniques as, for instance, from a suitable solvent such as dichloromethane, carbon disulfide, ethyl acetate, thionyl chloride and the like, or mixtures thereof.

The hydroxamic acids which are used in the process of the invention can be represented by the structure:

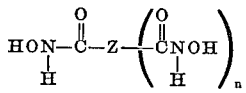

wherein Z and n are as defined above in the formula of the products of the invention. When the poly(nitrile sulfites) are to be made, the n of the hydroxamic acid is 1 to 3, preferably 1 to 2, and when producing the mono-(nitrile sulfites), n is 0. When Z contains an aromatic hydrocarbon radical it often has 1 to 3 aromatic rings and the radical usually contains 6 to about 30 or more carbon atoms, preferably 6 to 12 carbon atoms. Preferably the hydroxamic acid groups are in a nonortho position with respect to one another on the aromatic ring. The aromatic hydroxamic acid reactants include, for instance, benzo hydroxamic acid, naphtho hydroxamic acids, anthro hydroxamic acids, phenylbenzo hydroxamic acids, droxamic acids and dinaphthylalkylene hydroxamic acids. Illustrative aromatic polyhydroxamic acids suitable for use as reactants in the preparation of the aromatic poly(nitrile sulfites) include the following: benzodihydroxamic acids, such as isophthalodihydroxamic acid and terephthalodihydroxamic acid; benzotrihydroxamic acids, such as 1,3,5-benzenetrihydroxamic acid; benzotetrahydroxamic acids, such as pyromellitohydroxamic acid and prehnitotetrahydroxamic acid; 1,4-dimethyl-2,5-benzodihydroxamic acid; 1,3 - dimethyl - 2,4-benzodihydroxamic acid; 2,3-dimethyl-1,5-benzodihydroxamic acid; methylbenzodihydroxamic acids; methylbenzotrihydroxamic acids; ethylbenzodihydroxamic acids; ethylbenzotrihydroxamic acids; hexylbenzodihydroxamic acids, such as hexylisophthalodihydroxamic acids; nonylbenzodihydroxamic acids; dodecylbenzotrihydroxamic acids; pentadecylterephthalodihydroxamic acids; pentadecylbenzotrihydroxamic acids; tricosylbenzodihydroxamic acids, such as tricosylterephthalodihydroxamic acids; tricosylbenzotrihydroxamic acids; 1-benzyl-2,4-benzodihydroxamic acid; 2,8-naphthodihydroxamic acid; 1,3,5-naphthotrihydroxamic acid; cyclohexylterephthalodihydroxamic acids; tetrahydronaphthodihydroxamic acids; 2,2-bis(p-phenyl hydroxamic acid) propane; bis(p-phenylhydroxamic acid) methane; chloroisophthalodihydroxamic acids; 4 - bromo - 1,3,5 - benzotrihydroxamic acid; 3-nitroterephthalodihydroxamic acid; 2,8 - anthracenedihydroxamic acid; 4,4'-diphenylethanedihydroxamic acids; biphenyldihydroxamic acids; 2,2'-diphenylethanedihydroxamic acids; 4,4'-stilbenedihydroxamic acids; and 2,2'-stilbenedihydroxamic acid. Illustrative examples of aromatic poly(nitrile sulfites) include those corresponding to the foregoing hydroxamic acids such as terephthalodi(nitrile sulfite), etc.

Illustrative aromatic monohydroxamic acids suitable for use as reactants in the preparation of the aromatic mono(nitrile sulfites) include the following: benzohydroxamic acid; the monohydroxamic acids of alkylated benzenes, such as tolylhydroxamic acids, xylylhydroxamic acids, trimethylbenzohydroxamic acids, ethylbenzohydroxamic acids, hexylbenzohydroxamic acids, nonylbenzohydroxamic acids, dodecylbenzohydroxamic acids, dodecylbenzohydroxamic acids, pentadecylbenzohydroxamic acids and tricosylbenzohydroxamic acids; naphthomonohydroxamic acids, such as α-naphthohydroxamic acid; cyclohexylbenzohydroxamic acids; tetrahydronaphthohydroxamic acids; 4-chloro-benzohydroxamic acid; 4-bromobenzohydroxamic acid; 3-nitrobenzohydroxamic acid; anthracene monohydroxamic acids; biphenyl monohydroxamic acids, such as 4-phenylbenzohydroxamic acid; 4-benzylbenzohydroxamic acid; 4-phenylethylbenzohydroxamic acid; and the like. Illustrative examples of aromatic mono(nitrile sulfites) include those corresponding to the foregoing hydroxamic acids such as the mono nitrile sulfites of alkylated benzenes, e.g. tolyl(nitrile sulfites), etc.

Illustrative aliphatic polyhydroxamic acids suitable for use as reactants in the preparation of the aliphatic poly(nitrile sulfites) include the following: malonodihydroxamic acid, succinodihydroxamic acid, glutarodihydroxamic acid, adipodihydroxamic acid, pimelodihydroxamic acid, suberodihydroxamic acid, azelaodihydroxamic acid, sebacodihydroxamic acid, fumarodihydroxamic acid, itaconodihydroxamic acid, allylmalonodihydroxamic acid, allylsuccinodihydroxamic acid, xerodihydroxamic acid, cetylmalonodihydroxamic acid, 1,6,9-decanetrihydroxamic acid, 1,3,6-heptanetrihydroxamic acid, cyclohexyldihydroxamic acids, 4-bromo-1,6-hexanedihydroxamic acid; 2-chloro-1,9-nonanedihydroxamic acid, etc. Illustrative examples of aliphatic poly nitrile sulfites include those corresponding to the foregoing hydroxamic acids such as malonodi(nitrile sulfite), adipodi(nitrile sulfite), etc.

Illustrative aliphatic monohydroxamic acids suitable for use as reacants in the preparation of the aliphatic mono(nitrile sulfites) include the following: methylhydroxamic acid, ethylhydroxamic acid, propylhydroxamic acid, isopropylhydroxamic acid, butylhydroxamic acid, isobutylhydroxamic acid, pentylhydroxamic acid, 1-methyl-2-propylhexylhydroxamic acid, cyclohexylhydroxamic acid, 3,5-dimethylhexylhydroxamic acid, 2-methylbutylhydroxamic acid, n-nonylhydroxamic acid, decalinhydroxamic acids, n-dodecylhydroxamic acid, 2-propyldodecylhydroxamic acid, n-heptadecylhydroxamic acid, n-pentadecylhydroxamic acid, stearohydroxamic acid, tricosylhydroxamic acid, butenyl 3-hydroxamic acid, octenyl 7-hydroxamic acid, 2-ethyloctenyl-7-hydroxamic acid, 3,5-dimethyldecenylhydroxamic acids, n-dodecenyl-11-hydroxamic acid, oleohydroxamic acid, cetene hydroxamic acids, eicosenehydroxamic acids, cerotenehydroxamic acids, melenehydroxamic acids, 4-chlorobutylhydroxamic acid, 3,5-dibromohexyldroxamic acid, 8-nitrooctylhydroxamic acid, 1,3-butadienehydroxamic acid and isoprenehydroxamic acids. Illustrative examples of aliphatic mono nitrile sulfites include those corresponding to the foregoing hydroxamic acids such as ethyl mono nitrile sulfite), etc.

The products of the reaction of the present invention are valuable intermediates or precursors for the preparation of highly desired chemicals. For example, the nitrile sulfites can be thermally decomposed to isocyanates. Polyisocyanates, such as diisocyanates, have found extensive use in the preparation of high molecular weight polymers by reaction of the polyisocyanates with polymerizable organic compounds such as compounds with terminally active hydroxy and amine groups. Polyurethanes, for instance, are commonly prepared by the reaction of diisocyanates and polybasic alcohols such as the glycols. The nitrile sulfites can also be acid hydrolyzed to hydroxamic acids.

Decomposition of the nitrile sulfites to the corresponding isocyanates can be effected by simply heating the nitrile sulfite below the degradation point of the desired isocyanate product. Since the decomposition reaction is exothermic there may be a tendency of the reaction temperature to run away. Means for carrying away or absorbing heat may be used, therefore, to control the temperature below the degradation point of the desired isocyanate product. The heating temperature employed will vary, of course, depending upon the decomposition temperature of the feed and degradation temperature of the particular isocyanates being prepared. In most cases, however, temperature will usually fall in the range of about 50 to 200° C., preferably about 75 to 150°C.

Alternative to the aforementioned recrystallization technique, a convenient method for obtaining an essentially chlorine-free ring product is by extraction or washing with a hydrocarbon solvent. Various normally liquid hydrocarbon solvents can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular feed selected. If desired, a combination of both the recrystallization and extraction methods can be used to obtain essentially chlorine-free products. Thermal decomposition of the essentially chlorine-free feed results in improved yields of purer isocyanate product, which is also essentially chlorine-free.

The following examples will serve to illustrate the present invention.

EXAMPLE I

To a 300 cc. fluted, round bottom flask equipped with a reflux condenser attached to a $CaCl_2$ drying tube, were added 9.8 g. (0.050 mole) of isophthalodihydroxamic acid and 165 g. (1.35 moles) of thionyl chloride. The reaction mixture was stirred mechanically and heated to a maximum temperature of 45° C. for one hour. The resulting solution was filtered and the thionyl chloride removed under reduced pressure. There was obtained 14.4 g. of an isophthalodi(nitrile sulfite) product containing small amounts of impurities and having a melting point of 104–107° C. Recrystallization from carbon disulfide gave white crystals having a melting point of 118–119° C.

Analysis.—Calc'd for $C_2H_4N_2O_6S_2$ (percent): C, 33.33; H, 1.40; N, 9.72; S, 22.25. Found (percent): C, 34.03; H, 1.54; N, 9.32; S, 22.00.

The infrared spectrum ("Nujol" mull) of the recrystallized material was determined and showed a significant absorption peak at 6.22 microns, characteristic of conjugated C=N stretching vibrations, and a significant band in the 8.17 micron region, characteristic of cyclic sulfites.

EXAMPLE II

To a 300 cc. fluted, round bottom flask equipped with a reflux condenser attached to a $CaCl_2$ drying tube, were added 9.8 g. (0.050 mole) of terephthalodihydroxamic acid and 121 g. (1.01 moles) of thionyl chloride. The reaction mixture was stirred mechanically and heated to a maximum temperature of 45° C. for two hours. The resulting solution was filtered and the thionyl chloride removed under reduced pressure. There resulted 14.2 g. (99%) of terephthalodi(nitrile sulfite) containing small amounts of impurities and having a melting point of 139° C. (dec.). Recrystallization from dichloromethane gave white crystals, M.P. 143°C. (dec.).

Analysis.—Calc'd for $C_8H_4N_2O_6S_2$ (percent): C, 33.33; H, 140; N, 9.72; S, 22.25. Found (percent): C, 33.72; H, 1.54; N, 9.10; S, 22.30.

The infrared spectrum ("Nujol" mull) of the recrystallized material showed a significant band at 6.22 microns, characteristic of a conjugated C=N stretching vibration, and significant absorption in the 8.06 micron region, characteristic of cyclic sulfites.

EXAMPLE III

Fifty grams of an 85:15 mixture (weight ratio) of isophthalodihydroxamic acid and terephthalodihydroxamic acid was added to 298 g. of thionyl chloride at room temperature with mechanical stirring. The mixture was warmed to 45° C. where the solid dissolved almost completely and vigorous gas evolution was noted. After one hour at 45° C. and removal by filtration of a small amount of insoluble matter, the filtrate was chilled at −10° C. for several hours. Filtration of the cold mixture afforded 40 g. (52%) of a mixture of iso- and terephthalodi(nitrile sulfites), M.P. (dec.) 105–107° C. A second crop of less pure disulfites was obtained by complete evaporation of the thionyl chlorides: 30.5 g., M.P. (dec.) 95–98° C. Total yield, 915%.

EXAMPLE IV

To a 300 cc. fluted, round bottom flask equipped with a reflux condenser attached to a $CaCl_2$ drying tube, were added 4.2 g. (0.029 mole) of fumarodihydroxamic acid and 248 g. (2.08 moles) of thionyl chloride. The reaction mixture was stirred mechanically and heated to reflux for half an hour. The resulting solution was filtered and the thionyl chloride removed under reduced pressure. There resulted a quantitative yield of crude fumarodi(nitrile sulfite), M.P. 149–150° C. (dec.). Recrystallization from benzene gave chlorine-free white needles, M.P. 150° C. (dec.).

To a 500 cc. round bottom flask equipped with a reflux condenser attached to a $CaCl_2$ drying tube, were added 12 g. (0.050 mole) of thus prepared fumarodi(nitrile sulfite) and 200 cc. of ortho-dichlorobenzene. The reaction mixture was stirred mechanically and heated to reflux for two hours. The resulting solution was fractionally distilled to give 4.5 g. (82%) of chlorine-free trans-vinylene-diisocyanate, M.P. 152–155° C. at 745 mm. of Hg pressure.

EXAMPLE V

To a 500 cc. fluted, round bottom flask equipped with a reflux condenser attached to a $CaCl_2$ drying tube, were added 23.8 g. (0.14 mole) of adipodihydroxamic acid and 495 g. (4.16 moles) of thionyl chloride. The reaction mixture was stirred mechanically and heated to a maximum temperature of 55° C. for two hours. The resulting solution was filtered and the thionyl chloride removed under reduced pressure. There resulted a quantitative yield of crude adipodi(nitrile sulfite) which upon recrystallization from pentane gave chlorine-free white crystals, M.P. 45°C.

The infrared spectrum ("Nujol" mull) of the recrystallized material showed a significant band at 6.19 microns, characteristic of a C=N stretching vibration, and significant absorption in the 8.13 micron region, characteristic of cyclic sulfites.

EXAMPLE VI

To a 500 cc. fluted, round bottom flask equipped with a reflux condenser attached to a $CaCl_2$ drying tube, were added 28.0 g. (0.121 mole) of sebacodihydroxamic acid and 495 g. (4.16 moles) of thionyl chloride. The reaction mixture was stirred mechanically and maintained at a maximum temperature of 25° C. for two hours. The reaction mixture was filtered to give 5.9 g. of starting material. The thionyl chloride was removed under reduced pressure from the filtrate to give a quantitative yield of crude nitrile sulfite based on reacted starting material. The crude sebacodi(nitrile sulfite), M.P. 47–49° C., was recrystallized from pentane to give chlorine-free white crystals, M.P. 48–50° C.

Analysis.—Calc'd for $C_{10}H_{16}N_2O_6S_2$ (percent): C, 37.05; H, 4.94; N, 8.65; S, 19.75. Found (percent): C, 37.89; H, 5.50; N, 7.29.

The infrared spectrum ("Nujol" mull) of the recrystallized material showed a significant band at 6.19 microns, characteristic of a C=N stretching vibration, and significant absorption in the 8.15 micron region, characteristic of cyclic sulfites.

EXAMPLE VII

To a 300 cc. fluted, round bottom flask equipped with a reflux condenser attached to a $CaCl_2$ drying tube, are added 9.8 g. (0.084 mole) of butylhydroxamic acid and 165 g. (1.35 moles) of thionyl chloride. The reaction mixture is stirred mechanically and heated to reflux for half an hour. The resulting solution is filtered and the thionyl chloride removed under reduced pressure to obtain a butyl mono(nitrile sulfite) product containing small amounts of impurities. Recrystallization from benzene gives chlorine-free butyl mono(nitrile sulfite).

EXAMPLE VIII

To a 300 cc. fluted, round bottom flask equipped with a reflux condenser attached to a $CaCl_2$ drying tube, is added 9.8 g. (0.050 mole) of Decalin hydroxamic acid and 121 g. (1.01 moles) of thionyl chloride. The reaction mixture is stirred mechanically and heated to reflux for two hours. The resulting solution is filtered and the thionyl chloride removed under reduced pressure to obtain a Decalin mono(nitrile sulfite) product containing small amounts of impurities. Recrystallization from dichloromethane gives chlorine-free Decalin mono(nitrile sulfite).

EXAMPLE IX

To a 300 cc. fluted, round bottom flask, equipped with a reflux condenser attached to a $CaCl_2$ drying tube, were added 50 g. (0.30 mole) of p-methoxybenzohydroxamic acid and 372 g. (3.15 moles) of thionyl chloride. The reaction mixture was stirred rapidly and heated at 27° C. for one hour. The resulting solution was filtered and there resulted a quantitative yield of crude, oily p-methoxybenzonitrile sulfite which upon trituration with an etherpentane mixture gave chlorine-free solid, M.P. 40–44° C. The infrared spectrum ("Nujol" mull) of the solid material showed the typical nitrile sulfite absorptions.

EXAMPLE X

In a manner similar to Example IX, 50.0 g. (0.274 mole) of p-nitrobenzohydroxamic acid was treated with 330 g. (2.77 moles) of thionyl chloride for four hours at a maximum temperature of 35° C. There was obtained a quantitative yield of crude p-nitrobenzonitrile sulfite which upon trituration with pentane gave a chlorine-free white solid, M.P. 126–127° C. (dec.). The infrared spectrum ("Nujol" mull) of the material showed the significant C=N stretching vibration in the 6.25 micron region and a bond at 8.0 microns, characteristic of cyclic sulfites.

EXAMPLE XI

In like fashion, to Example IX, 49.7 g. (0.273 mole) of m-nitrobenzohydroxamic acid was treated with 330 g. (2.77 moles) of thionyl chloride for an hour and a quarter at a maximum temperature of 44° C. There was obtained a quantitative yield of crude m-nitrobenzonitrile sulfite which upon trituration with pentane gave a solid, M.P. 68–71° C. The infrared spectrum ("Nujol" mull) of the material showed the characteristic nitrile sulfite stretching vibrations.

EXAMPLE XII

Eight different attempts at preparing terephthalodi(nitrile sulfite) were run batchwise. In each run terephthalodihydroxamic acid, thionyl chloride and added solvent (if any) were mixed together in a 4-neck, round bottom flask, equipped with stirrer, reflux condenser and thermometer. The resulting mixture was then heated up to reaction temperature and held there for the time specified in the table following. At the end of the reaction time, the mixture was allowed to cool to about 25° C. and was filtered; any filter cake obtained thereby was then washed with fresh solvent and dried under vacuum. (In Runs 7 and 8 the filter cake was washed three times with dry n-hexane.) The washed and dried filter cake was then subjected to infrared analysis to determine whether it was comprised of unreacted starting material or product. In Runs 1 and 6–8 essentially all of the filter cake was found to be product and was analyzed for weight percent carbon, hydrogen, sulfur and chlorine. In Runs 3, 4 and 5 the filter cake analyzed as starting material. No filter cake was obtained in Run 2.

The filtrate obtained in each of the runs was evaporated to dryness under vacuum, and the remaining solid subjected to infrared analysis to determine whether it was comprised of unreacted starting material or product. In Runs 1, 3 and 5–8 the solid remaining after evaporation of the filtrate was found to contain product and was analyzed for weight percent carbon, hydrogen, sulfur and chlorine. In Run 2 the remaining solid was found to be unreacted starting material.

TABLE

| Run | Added solvent | Amount of added solvent, cc. | Moles of— | | Temp., °C. | Time, hrs. | Amount of residue, g. | Amount of product in— | |
|---|---|---|---|---|---|---|---|---|---|
| | | | TPDHA[1] | SOCl[2] | | | | Filter cake, g. | Filtrate, g. |
| 1 | THF[3] | 400 | 0.2 | 0.44 | 50 | 1 | 0.5 | 30.3 | [4]30 |
| 2 | Hexane | 400 | 0.2 | 0.44 | 50 | 2 | 0 | 0 | 0 |
| 3 | CHCl$_3$ | 400 | 0.2 | 0.44 | 50 | 7 | 15.5 | 0 | 33.4 |
| 4 | Benzene | 400 | 0.1 | 0.22 | 50 | 4 | 15.0 | 0 | 7.0 |
| 5 | Dioxane | 400 | 0.1 | 0.22 | 50 | 4 | 1.5 | 0 | 29.4 |
| 6 | None | | 0.4 | 6.61 | 50 | 1 | 0 | 120 | 13.2 |
| 7 | do | | 0.2 | 2.0 | 50 | 1 | 0 | 54.4 | 3.2 |
| 8 | Benzene | 400 | 0.2 | 2.0 | 50 | 10 | | 45.6 | 11.5 |

| | | | | Analysis of product | | | | |
|---|---|---|---|---|---|---|---|---|
| Run | Percent conversion[5] | Source of product | Percent yield[6] | Color | Weight percent | | | |
| | | | | | C | H | S | Cl |
| 1 | 100 | Filter cake | 52.6 | White | 35.92 | 1.68 | 20.9 | 0.10 |
| | | Filtrate | 50.4 | Brown | 37.89 | 2.92 | 14.7 | 9.05 |
| 2 | 0 | | | | | | | |
| 3 | 60.5 | Filtrate | 96.8 | Yellow | 37.40 | 2.00 | 12.2 | 2.35 |
| 4 | 24 | do | 101 | do | 36.68 | 2.06 | 2.51 | 2.12 |
| 5 | 92.3 | do | 110 | Brown | 42.89 | 3.50 | 13.1 | 3.49 |
| 6 | 100 | Filter cake | 88.6 | White | 35.31 | 1.62 | 22.0 | 0.05 |
| | | Filtrate | 11.4 | Brown | 36.01 | 1.80 | 19.9 | 2.52 |
| 7 | 100 | Filtrate cake | 94.4 | White | 33.1 | 1.61 | 19.6 | 1.21 |
| | | Filtrate | 5.5 | Yellow | 38.86 | 2.73 | 6.27 | 4.03 |
| 8 | 100 | Filter cake | 79.1 | White | 33.3 | 1.62 | 20.2 | 1.64 |
| | | Filtrate | 20.0 | | 38.69 | 2.72 | 3.41 | 9.94 |
| Theoretical analysis of product | | | | | 33.33 | 1.40 | 22.25 | 0.00 |

[1] Terephthalodihydroxamic acid.
[2] Unreacted starting material in filter cake.
[3] Tetrahydrofuran.
[4] Approximately.
[5] Based on weight of terephthalodihydroxamic acid.
[6] Based on weight of product which theoretically represents 100% yield.

The data in the above table demonstrate that greater yields and greater product purity were obtained when the terephthalodi(nitrile sulfite) was prepared by reacting the hydroxamic acid and the thionyl chloride in the substantial absence of additional solvent, than when reacting them in the presence of additional solvent. As is evident from the analyses reported in the table, the highest quality products were those obtained from the filter cakes of Runs 6, 7 and 8. Runs 6 and 7 were according to the process of the present invention, using only excess thionyl chloride as reaction solvent. Run 8, which required about 10 times as long to get a complete reaction, was run identically to Run 7 except that 400 cc. of benzene was added to the reaction mixture. The result of the inclusion of the benzene was a reduction in the yield of the high quality product from 94.4% to 79.1%.

Three additional runs (not reported in the table) were attempted in a manner identical to Run 7 except that 0.8, 1.2 and 1.6 moles, respectively, of thionyl chloride were employed (representing molar ratios of thionyl chloride to hydroxamic acid group of 2:1, 3:1 and 4:1). These amounts of thionyl chloride were insufficient to give fluid reaction media and the attempts proved unsuccessful.

It is claimed:

1. A method of preparing a cyclic nitrile sulfite of the formula:

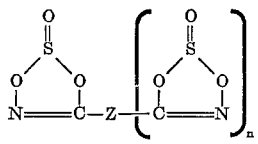

wherein Z is a member selected from the group consisting of aliphatic or cycloaliphatic hydrocarbon, optionally substituted by a chloro, bromo or nitro substituent, of 1 to 30 carbon atoms and aromatic hydrocarbon, optionally substituted by a chloro, bromo or nitro substituent, of up to 30 carbon atoms and having 1 to 3 aromatic rings, and $n$ is 0 to 3, which consists essentially of reacting, at a temperature below the decomposition temperature of said cyclic nitrile sulfite, hydroxamic acid of the formula:

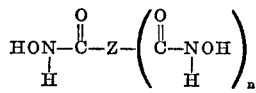

with thionyl chloride in the presence of at least about 5 moles of thionyl chloride per mole of hydroxamic acid group and sufficient to give a fluid reaction medium, the reaction of said thionyl chloride and said acid being conducted in the substantial absence of an added solvent for said hydroxamic acid.

2. The method of claim 1 in which there are present about 5 to 20 moles of thionyl chloride per mole of hydroxamic acid group.

3. The method of claim 2 in which Z is aromatic and $n$ is 1 to 3.

4. The method of claim 3 in which $n$ is 1.

5. The method of claim 4 in which Z is phenylene.

6. The method of claim 5 in which the reaction temperature is up to about 60° C.

7. The method of claim 3 in which the reaction temperature is up to about 60° C.

8. The method of claim 1 wherein Z contains 1 to 12 carbon atoms.

9. The method of claim 8 wherein $n$ is 1 or 2.

10. The method of claim 9 wherein Z is aromatic.

11. The method of claim 9 wherein Z is aliphatic.

12. The method of claim 11 wherein $n$ is 1 and Z is $-CH_2-CH_2-CH_2-CH_2$.

References Cited

UNITED STATES PATENTS

| | | | |
|---|---|---|---|
| 3,169,130 | 2/1965 | Chiddix et al. | 260—327 |
| 3,238,220 | 3/1966 | Boshagen | 260—301 |
| 3,268,542 | 8/1966 | Burk et al. | 260—301 |

FOREIGN PATENTS

| | | | |
|---|---|---|---|
| 944,406 | 12/1963 | Great Britain | 260—327 |

OTHER REFERENCES

Knunyants et al., Chem. Abstracts, 54, cols. 259–60 (1960).

RICHARD J. GALLAGHER, Primary Examiner

U.S. Cl. X.R.

260—240 CA, 240 E